(12) United States Patent
Liau

(10) Patent No.: US 8,579,261 B1
(45) Date of Patent: Nov. 12, 2013

(54) PULLY SEAT

(71) Applicant: Wan Lai Liau, Taipei (TW)

(72) Inventor: Wan Lai Liau, Taipei (TW)

( * ) Notice: Subject to any disclaimer, the term of this patent is extended or adjusted under 35 U.S.C. 154(b) by 0 days.

(21) Appl. No.: 13/691,937

(22) Filed: Dec. 3, 2012

(51) Int. Cl.
*B66D 3/04* (2006.01)

(52) U.S. Cl.
USPC .............................. 254/412; 254/416; D8/360

(58) Field of Classification Search
USPC ..................... 254/405, 406, 412, 416; D8/360
See application file for complete search history.

(56) References Cited

U.S. PATENT DOCUMENTS

| | | | | |
|---|---|---|---|---|
| D16,980 S | * | 11/1886 | Kuhn ............................. | D8/360 |
| 352,539 A | * | 11/1886 | Handy .......................... | 254/412 |
| D19,245 S | * | 7/1889 | Palmer .......................... | D8/360 |
| D19,570 S | * | 1/1890 | Palmer .......................... | D8/360 |
| 438,454 A | * | 10/1890 | Weeks .......................... | 254/412 |
| D28,397 S | * | 3/1898 | Ocumpaugh .................. | D8/360 |
| 793,918 A | * | 7/1905 | Clark ............................... | 16/215 |
| 805,408 A | * | 11/1905 | Broadbent et al. ............ | 384/289 |
| 806,562 A | * | 12/1905 | Opsal ............................. | 254/405 |
| 1,034,437 A | * | 8/1912 | Fulton et al. .................. | 254/409 |
| 1,634,773 A | * | 7/1927 | Coventry ...................... | 254/411 |
| 2,147,183 A | * | 2/1939 | Zimbalist ...................... | 254/412 |
| 3,378,233 A | * | 4/1968 | Ferdig ........................... | 254/409 |
| 3,899,158 A | * | 8/1975 | Johnson ........................ | 254/405 |
| 4,079,916 A | * | 3/1978 | Einhorn et al. ............... | 254/390 |
| 4,325,537 A | * | 4/1982 | Winter et al. ................. | 254/405 |
| 5,154,401 A | * | 10/1992 | Schramm et al. ............ | 254/416 |
| 6,244,570 B1 | * | 6/2001 | Habberstad ................... | 254/406 |

\* cited by examiner

*Primary Examiner* — Emmanuel M Marcelo
(74) *Attorney, Agent, or Firm* — Jackson IPG PLLC

(57) ABSTRACT

A pulley seat includes a housing including a cover including a slot on an intermediate portion, and a casing including first and second stepped diameter holes on both sides respectively wherein the housing is integrally formed by hot forging; a pulley including an axial channel; a bearing having an axial hole and being rotatably disposed in the axial channel; a stepped-diameter first sleeve disposed in the first stepped diameter hole; a stepped-diameter second sleeve disposed in the second stepped diameter hole; and a pivot pin rotatably disposed in the first sleeve, the axial hole, and the second sleeve.

1 Claim, 5 Drawing Sheets

PULLY SEAT

CROSS-REFERENCE TO RELATED APPLICATIONS

The subject matter of this application is related to U.S. Pat. No. 6,478,286 and U.S. patent application Ser. No. 13/233,216 filed Aug. 31, 2011, the teachings of which are incorporated herein by reference in their entirety.

BACKGROUND OF THE INVENTION

1. Field of the Invention

The invention relates to pulley seats and more particularly to a pulley seat with improved characteristics including increased load.

2. Description of Related Art

A conventional riveted structure for a pulley seat is shown in FIG. 6 and comprises a housing 12, a cover 11 including a slot (not numbered) and two pegs 112 at both ends of the slot respectively, and a pulley 2 pivotally provided in the housing 12. The pegs 112 are inserted through two end holes (not numbered) on a top of the housing 12 and hammered to form rivets for fastening the cover 11 and the housing 12 together.

However, the rivets and portions adjacent to it are not aesthetic. Further, its structural strength is adversely affected. Thus, the need for improvement still exists.

SUMMARY OF THE INVENTION

It is therefore one object of the invention to provide a pulley seat comprising a housing comprising a cover including an oval slot on an intermediate portion, and a casing having an oval cross-section, the casing including first and second stepped diameter holes on both sides respectively wherein the housing is integrally formed by hot forging; a pulley comprising an axial channel; a bearing having an axial hole and being rotatably disposed in the axial channel; a first sleeve having a stepped-diameter passage and being disposed in the first stepped diameter hole; a second sleeve having a stepped-diameter passage and being disposed in the second stepped diameter hole; and a pivot pin rotatably disposed in the first sleeve, the axial hole, and the second sleeve.

The above and other objects, features and advantages of the invention will become apparent from the following detailed description taken with the accompanying drawings.

DETAILED DESCRIPTION OF THE INVENTION

Figure 1:
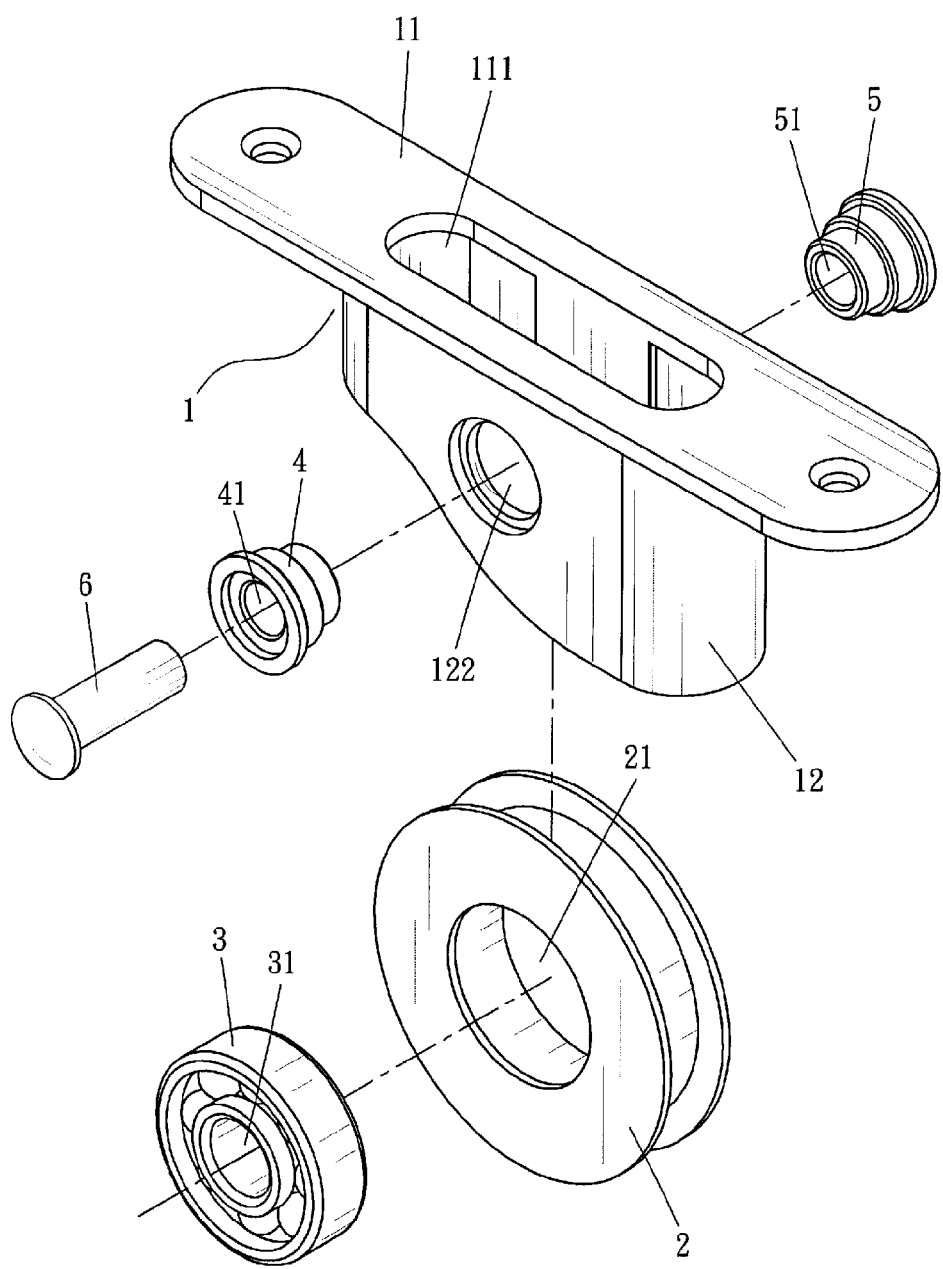
FIG. 1 is an exploded view of a pulley seat according to the invention.
Figure 2:
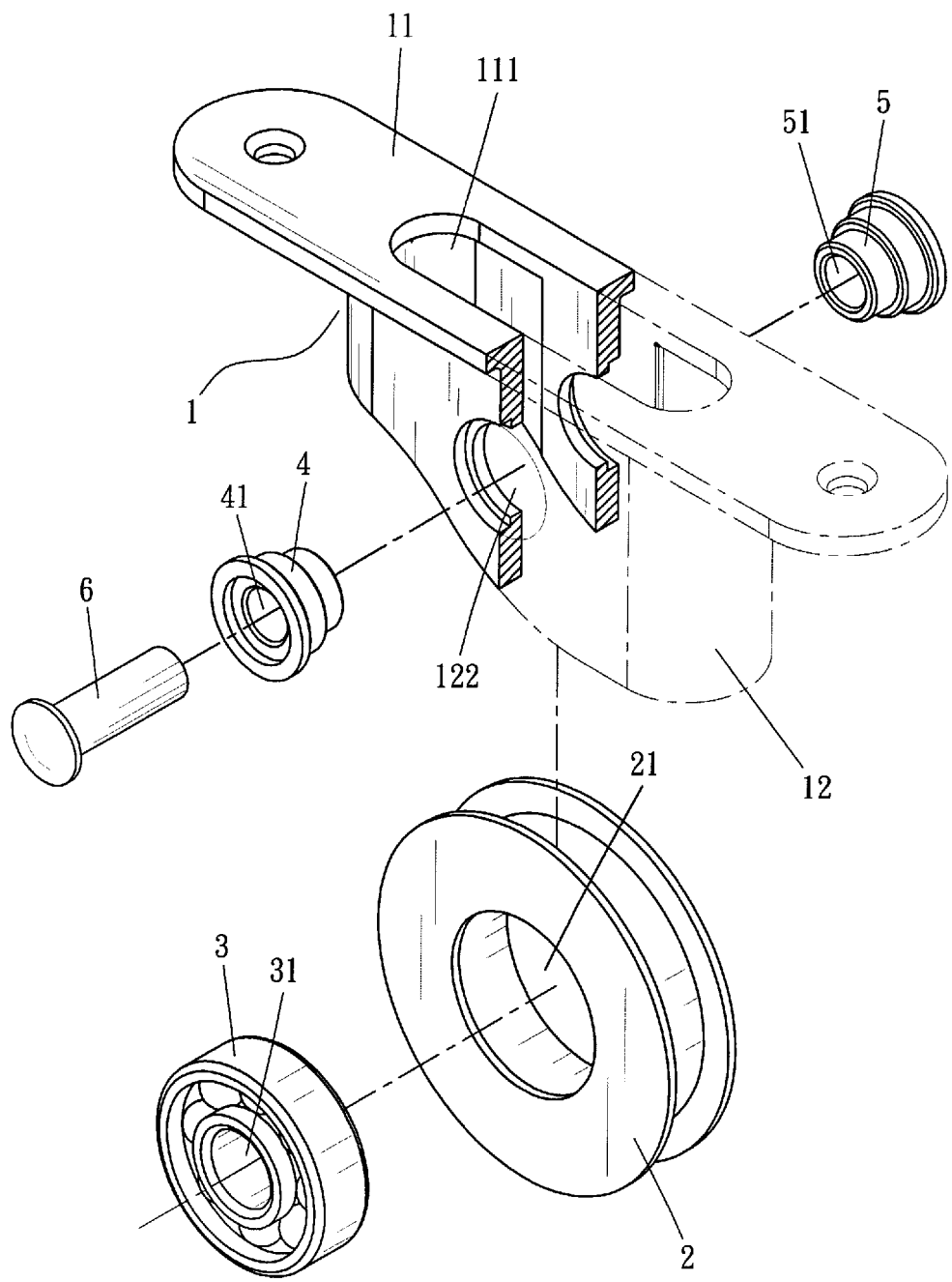
FIG. 2 is another exploded view of the pulley seat.
Figure 3:
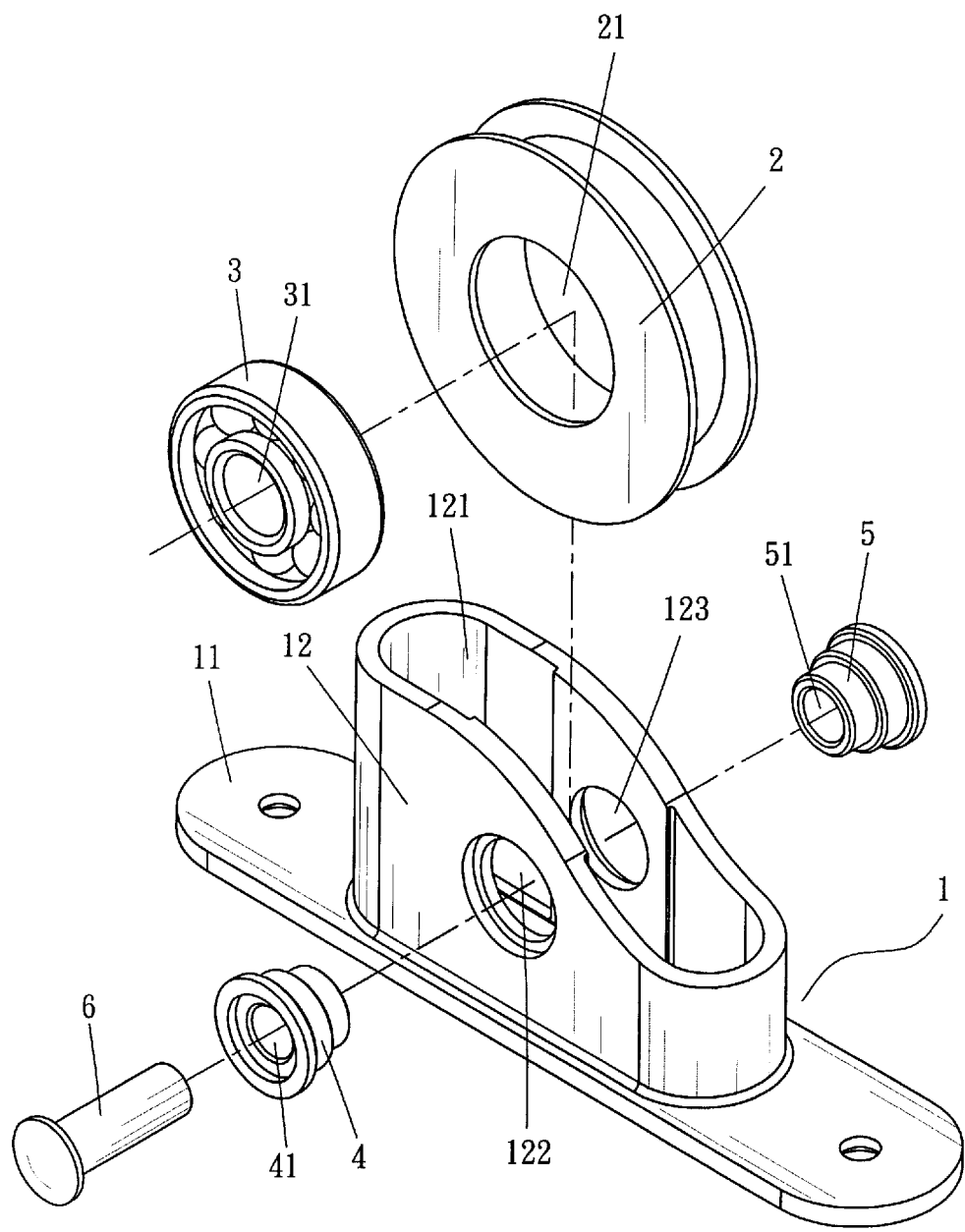
FIG. 3 is still another exploded view of the pulley seat.
Figure 4:
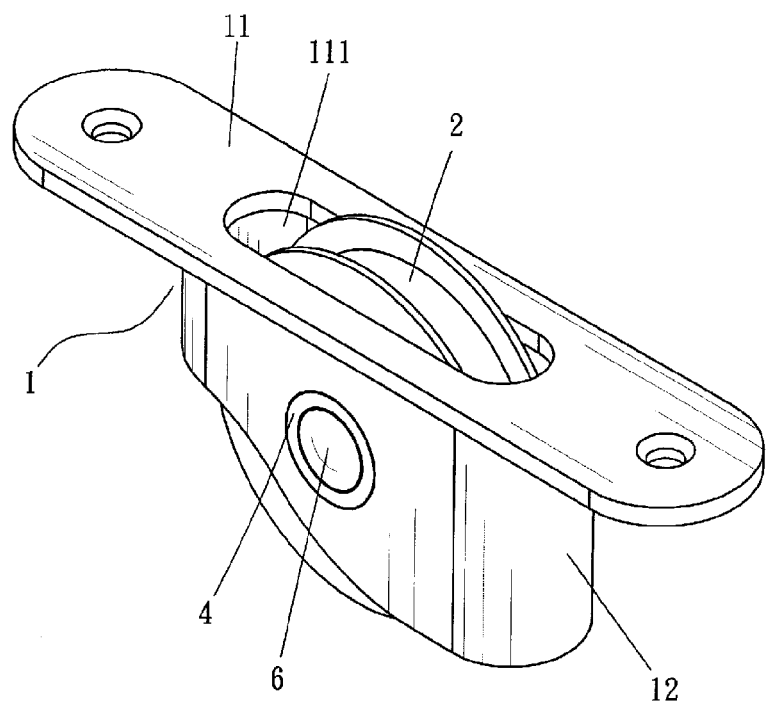
FIG. 4 is a perspective view of the assembled pulley seat.
Figure 5:
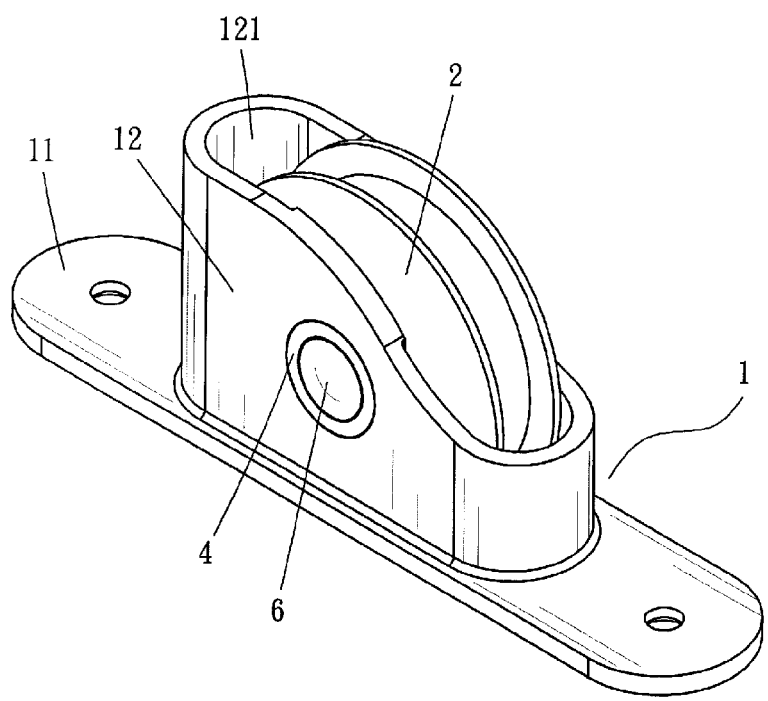
FIG. 5 is another perspective view of the assembled pulley seat.
Figure 6:
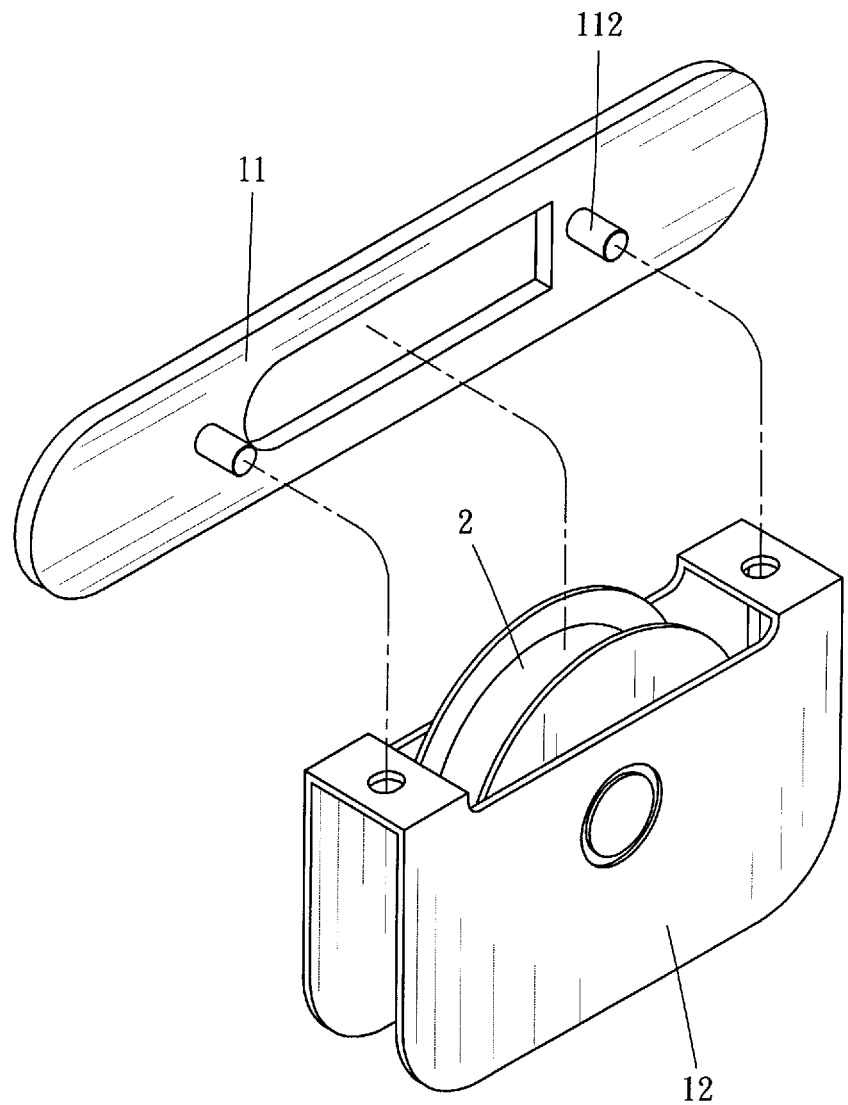
FIG. 6 is an exploded perspective view of a conventional riveted structure for a pulley seat.

Referring to FIGS. 1 to 5, a pulley seat in accordance with the invention comprises the following components as discussed in detail below.

A housing 1 is integrally formed by hot forging and comprises a cover 11 on top, the cover 11 including an oval slot 111 on an intermediate portion, and a casing 12 having an oval cross-section, the casing 12 including two stepped diameter holes 122 and 123 on both sides respectively.

A pulley 2 comprises an axial channel 21 and has a grooved rim in which a rope or chain (not shown) runs. A bearing 3 having an axial hole 31 is rotatably disposed in the channel 21.

A first sleeve 4 having a stepped-diameter passage 41 is disposed in one hole 122 and a second sleeve 5 having a stepped-diameter passage 51 is disposed in the other hole 123 respectively. A pivot pin 6 is disposed into the first sleeve 4, the hole 31, and the second sleeve 5 and fastened by riveting at on end.

Force exerted by Sash code or Sash chain cannot adversely affect load of the pulley seat.

Shear force of the pulley seat of the invention can be obtained by the following expression:

$$\text{Load} = \text{radius of pivot pin} \times \text{radius of pivot pin} \times 3.14 \times \text{hardness of pivot pin}$$

In an exemplary example, the pivot pin 6 is made of stainless steel and has a hardness of 10. Thus, load is 4 mm×4 mm×3.14×10 and equal to 502.40 kg.

As a comparison, the conventional pivot pin is made of plain carbon steel and has a hardness of 5.7. Thus, the load of the conventional pulley seat is 2 mm×2 mm×3.14×5.7 and equal to 71.59 kg.

It is concluded that the load of the invention is greatly increased as compared with the load of the conventional pulley seat.

It is envisaged by the invention that the visually unattractive conventional rivets and portions adjacent to it are eliminated. Further, its structural strength is greatly increased.

While the invention has been described in terms of preferred embodiments, those skilled in the art will recognize that the invention can be practiced with modifications within the spirit and scope of the appended claims.

What is claimed is:

1. A pulley seat comprising:

a housing comprising a cover including an oval slot on an intermediate portion, and a casing having an oval cross-section, the casing including first and second stepped diameter holes on both sides respectively wherein the housing is integrally formed by hot forging;

a pulley comprising an axial channel;

a bearing having an axial hole and being rotatably disposed in the axial channel;

a first sleeve having a stepped-diameter passage and being disposed in the first stepped diameter hole;

a second sleeve having a stepped-diameter passage and being disposed in the second stepped diameter hole; and a pivot pin rotatably disposed in the first sleeve, the axial hole, and the second sleeve.

* * * * *